United States Patent [19]

Hayashi et al.

[11] 3,733,986
[45] May 22, 1973

[54] DEVICE FOR ASCERTAINING CHARGING ON ELECTRONIC FLASH UNIT

[75] Inventors: Toshio Hayashi, Sahigaoka-Nakamachi; Keisuke Maeda, Osaka; Yoshiharu Ohta, Hyogo, all of Japan

[73] Assignee: Minolta Camera Kabushiki Kaisha, Osaka, Japan

[22] Filed: Nov. 25, 1970

[21] Appl. No.: 92,773

[30] Foreign Application Priority Data

Dec. 9, 1969 Japan..............................44/117282

[52] U.S. Cl. .................................................95/11 V
[51] Int. Cl. ..............................................G03b 17/20
[58] Field of Search ........................95/11.5 R, 11 V

[56] References Cited

UNITED STATES PATENTS 3,393,620  7/1968  Reiche et al.........................95/11 R
3,424,071  1/1969  Schwahn..............................95/11.5
3,374,718  3/1968  Hochreiter..........................95/11.5

FOREIGN PATENTS OR APPLICATIONS 248,869  8/1966  Austria...............................95/11 V Primary Examiner—Samuel S. Matthews
Assistant Examiner—Kenneth C. Hutchison
Attorney—Stanley Wolder

[57] ABSTRACT

A device is provided with a light-transmitting rod for conducting light from a charge-indicating lamp on an electronic flash unit into the field of view of the camera viewfinder. One end of the light-transmitting member is positioned in front of the viewfinder lens system to introduce the light from the charge indicating lamp into the part of the field of view of the viewfinder outside of the scene-delineating frame, thereby to enable the operator to ascertain completion of charging while using the viewfinder.

4 Claims, 5 Drawing Figures

PATENTED MAY 22 1973 3,733,986

Inventor
TOSHIO HAYASHI, KEISUKE
MAEDA, YOSHIHARU OHTA
By Stanley Wolder
Attorney

DEVICE FOR ASCERTAINING CHARGING ON ELECTRONIC FLASH UNIT

BACKGROUND OF THE INVENTION

The present invention relates to a device for ascertaining charging on an electronic flash unit, more particularly to a device for ascertaining charging on an electronic flash unit within the field of view covered by the viewfinder of a camera.

In recent years, electronic flash has come to be used very frequently for taking photographs, and the electronic flash has made rapid progress. However, the efforts heretofore made have been directed only to the improvements in the electronic flash unit per se, with hardly any consideration given to the cooperative relationship between the electronic flash unit and the camera body. For this reason, the electronic flash not infrequently fails to fully exhibit its function.

More specifically, when the electronic flash unit is to be used in conventional manner, the unit is first mounted on a camera and connected to the synchronized flashing switch of the camera, and the power source switch is then closed. After waiting for a while until completion of charging on the electronic flash, the operator ascertains lighting of the charge indicating lamp and depresses the shutter button. During this procedure, the operator conducts film wind-up and focusing and determines a scene to be photographed. At this time, the operator has to turn his eyes away from the viewfinder to ascertain lighting of the charge indicating lamp, with the result that the operator often loses a critical moment for taking a photograph.

On the other hand, a structure is known by which the light from the charge indicating lamp is introduced into the light path of the viewfinder for checking completion of charging, but in order to lead the light of the charge indicating lamp into an intermediate portion of the viewfinder lens system, the camera has to be provided with an opening for introducing the light in the upper face of the viewfinder and a reflecting mirror for directing the light led into the finder to the finder eyepiece portion. Such structure further requires additional means for keeping out dust or the like, with the undesired result that the mechanism of camera, especially that of the viewfinder section, becomes inevitably complex. Moreover, provision of a reflecting mirror within the fiewfinder gives rise to objections in the limited space within the viewfinder, thus enhancing the difficulties encountered in designing a camera.

SUMMARY OF THE INVENTION

An object of this invention is to provide a device which enables the operator to ascertain lighting of the charge indicating lamp without turning his eyes away from the viewfinder so as to eliminate foregoing inconveniences.

Another object of this invention is to provide a device by which the operator can ascertain lighting of the charge indicating lamp immediately when the electronic flash unit is mounted on the camera without necessity to provide in a camera and finder section a special mechanism for such purpose.

Still another object of the present invention is to provide a device wherein means for ascertaining lighting of the charge indicating lamp is protected from damage when the electronic flash unit is mounted on or removed from the camera.

In accordance with the present invention, one end of a member for transmitting light from the charge indicating lamp is projected from the front under face of an electronic flash unit. The face of the projected end of the transmitting member substantially provides a total reflection plane for the light, and when the electronic flash unit is mounted on the camera, the reflecting plane is positioned within the light path of the finder lens system in front of the viewfinder optical system of the camera where it causes no trouble in determination of the scene to be photographed, the arrangement being such that the light from the charge indicating lamp conducted by the transmitting member is introduced into an area where the light causes no trouble to the determination of the scene to be photographed.

Thus the present device enables the operator to ascertain completion of charging on electronic flash by observing turning on of the charge indicating lamp without turning his eyes away from the viewfinder of the camera. Since the member for transmitting the light from the charge indicating lamp is disposed in the electronic flash unit with its reflecting plane positioned in front of the viewfinder, there is no need to provide machining for the camera body and the viewfinder unit for the purpose of incorporating therein means for ascertaining charging on the electronic flash unit.

To prevent damage of the member for transmitting light from the charging indication lamp when the electronic flash unit is mounted on or removed from the camera, it is possible to completely retract the light transmitting member into the electronic flash unit by an operating member projected from the side face of the electronic flash unit when mounting or demounting the electronic flash unit.

Other objects and advantages of the present invention will become apparent from the following description of embodiments of this invention.

DESCRIPTION OF THE PREFERRED EMBODIMENTS

Figure 1:
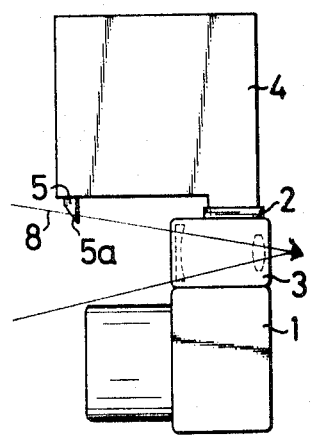
FIG. 1 is a side elevation showing an embodiment of this invention.
Figure 2:
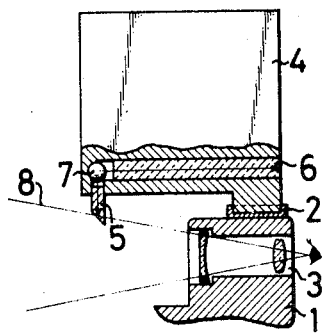
FIG. 2 is a sectional view of a principal part of FIG. 1.

Referring to FIGS. 1 and 2, a camera body 1, an accessory shoe 2 of the camera, a viewfinder lens system 3, and an electronic flash unit 4 are shown. Incorporated in the electronic flash unit 4 are light transmitting rods 5 and 6 serving as members for transmitting light from a charge indicating lamp 7. The light transmitting rod 5 has one end extending from the under face of the electronic flash unit 4 at its front portion. The obliquely cut end face 5a, providing a total reflection plane, is positioned in the light path 8 of the viewfinder lens system 3 so as to cause the light from the charge indicating lamp 7 to be reflected onto a portion within the coverage of the viewfinder, this portion being such that the reflection of the light causes no trouble to the determination of a scene to be photographed. Thus the light can be observed when the user looks through the viewfinder. The provision of the light transmitting rod 6 enables the user to ascertain the lighting of the charge indicating lamp also on the rear of the electronic flash unit 4.

Figure 3:
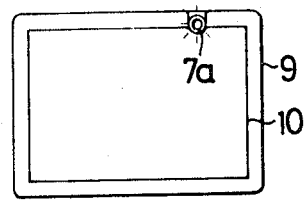
FIG. 3 is a diagram illustrating the view covered by a viewfinder of this invention.

FIG. 3 shows a view 9 covered by the viewfinder and provided with a frame 10. As indicated at 7a in the figure, the arrangement of this invention is so adapted that the light from the lamp 7 reflected by the end face 5a of the light transmitting rod 5 will strike a portion outside the frame 10 so as to eliminate any possible trouble encountered in focusing and determination of a scene to be photographed. In accordance with the present invention, therefore, there is no need whatever to provide in the viewfinder lens system 3 a member for reflecting the light from the lamp 7, with the result that there arises no objection in the limited space of the viewfinder, the present arrangement thus overcoming difficulties to be otherwise experienced in designing the camera.

Although the foregoing embodiment employs the light transmitting rod 5 for introducing the light from the charge indicating lamp 7 into the light path 8 of the viewfinder to cause the light to enter the view 9 of the finder, the charging indication lamp 7 may alternatively be projected from the electronic flash unit 4 directly into the light path 8 of the finder so as to introduce the light into the coverage of the viewfinder. In this case, the light of the charge indicating lamp can be seen also by the person to be photographed.

Figure 4:
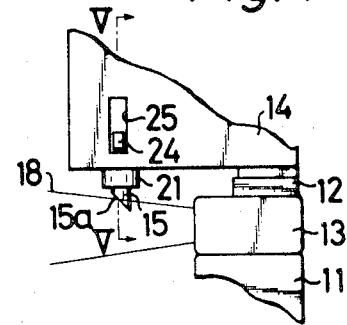
FIG. 4 is a side elevation showing a principal part of another embodiment.
Figure 5:
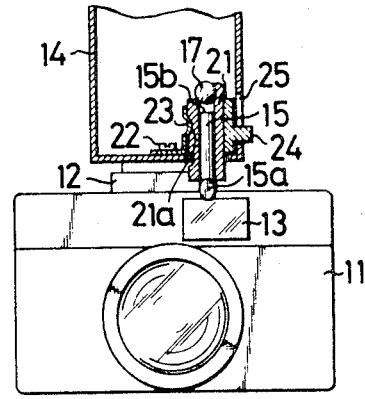
FIG. 5 is a front view in vertical section taken along the line V—V in FIG. 4 and showing the same.

FIGS. 4 and 5 show an embodiment wherein the light transmitting rod, charge indicating lamp and the like are projected from the electronic flash unit and so adapted that they do not hit the camera when the electronic flash unit is mounted on or removed from the camera.

A camera body 11 is provided with an accessory shoe 12 and a viewfinder lens system 13. Indicated at 14 is an electronic flash unit and at 15 a light transmitting rod serving as a member for transmitting light from a charge indicating lamp 17 and provided with a lower end face 15a positioned in the light path 18 of the viewfinder and an upper end face 15b facing the lamp 17. The lower end face 15a of the light transmitting rod 15, cut obliquely, provides a total reflection plane.

A holder 21 for the light transmitting rod 15 is provided in one side with a click groove 21a for engagement with a spring click 23 secured to the electronic flash unit 14 by a screw 22. The holder 21 is further formed on the other side with a knob 24 for moving the holder up and down which is outwardly projected from the electronic flash unit 14 through a vertically elongated slot 25 in the side face of the unit 14. When the knob 24 is pushed upward, the holder 21 is moved into the electronic flash unit 14, so that when the electronic flash is to be mounted or removed from the camera, the light transmitting rod will not hit the upper cover of the camera body 11. When the electronic flash is mounted on the camera, the knob 24 is depressed so as to project the light transmitting rod into the light path of the viewfinder.

What we claim is:

1. In the combination of a photographic camera provided with an accessory shoe and a viewfinder having a scene delineating frame and an electronic flash unit to be detachably mounted on said accessory shoe and having a charge indicating lamp, a device comprising means supported by a holder adapted to be extended from and retracted into said electronic flash unit and enabling the operator to see the light from said charge indicating lamp within said viewfinder when said electronic flash unit is mounted on said accessory shoe, said means being disposed in front of the viewfinder lens system of said camera and adapted to introduce the light from said charge indicating lamp into the light path of said viewfinder outside said scene delineating frame.

2. In the combination of a photographic camera provided with an accessory shoe and a viewfinder having a scene delineating frame and an electronic flash unit to be detachably mounted on said accessory shoe and having a charge indicating lamp, a device comprising means positioned below the front bottom of said flash unit and disposed in front of said finder when said electronic flash unit is attached to said accessory shoe for introducing the light of said charge indicating lamp into the light path of said finder outside said scene delineating frame, said means comprising a light transmitting rod having one end facing said charge indicating lamp and the other end disposed in the light path of said viewfinder.

3. The device of claim 2, comprising further a light transmitting rod, one end of which faces said charge indicating lamp and the other is disposed on the rear of said flash unit.

4. In the combination of a photographic camera provided with an accessory shoe and a viewfinder having a scene delineating frame and an electronic flash unit to be detachably mounted on said accessory shoe and having a charge indicating lamp, a device comprising means positioned below the front bottom of said flash unit and disposed in front of said finder when said electronic flash unit is attached to said accessory shoe for introducing the light of said charge indicating lamp into the light path of said finder outside said scene delineating frame, said charge indicating lamp being disposed in the light path of said viewfinder.

* * * * *